Jan. 30, 1962  R. L. HANKIN  3,018,678
MECHANISM FOR END CROPPING AND TEST
SAMPLING WELDED SEAM TUBING
Filed April 2, 1958  2 Sheets-Sheet 1

INVENTOR.
RALPH L. HANKIN
BY
Malcolm W. Fraser
ATTORNEY

INVENTOR.
RALPH L. HANKIN
BY
Malcolm W. Fraser
ATTORNEY 3,018,678
MECHANISM FOR END CROPPING AND TEST SAMPLING WELDED SEAM TUBING
Ralph L. Hankin, Holland, Ohio, assignor to Abbey Etna Machine Company, Perrysburg, Ohio, a corporation of Ohio
Filed Apr. 2, 1958, Ser. No. 725,977
1 Claim. (Cl. 82—101)

This invention relates to devices for cutting lengths of tubing to provide a test sample and also an end crop. It is customary particularly in connection with welded seam tubing to crop the end in order to have an end for the tubing which is not only square but free from burrs or end irregularities. Usually a test sample consisting of a short length of welded tube is also cut from the tubing so that the weld can be carefully examined and tested. The end crop as well as the test sample heretofore have been severed at different times and this is not only time consuming and costly but an annoyance as well. Difficulties have been encountered in attempts to sever both of these pieces at one time particularly where revolving cutters are employed because the severed sections drop into the path of the cutters and damage ensues.

This invention overcomes difficulties heretofore experienced and makes possible the severing of both the end crop and test sample at substantially the same time in spite of the employment of revolving cutting mechanism. The severed section providing the test sample is chucked interiorly so that after severance has been completed, it is retained in place and held against falling into the path of the revolving cutters. Provision is also made to restrain the end crop from causing damage. Both the test sample and the end crop are concomitantly conveyed away from the cutting mechanism after severance has been accomplished.

Other objects and advantages of the invention will hereinafter appear and for purposes of illustration but not of limitation, an embodiment of the invention is shown on the accompanying drawing in which.

Figure 1:
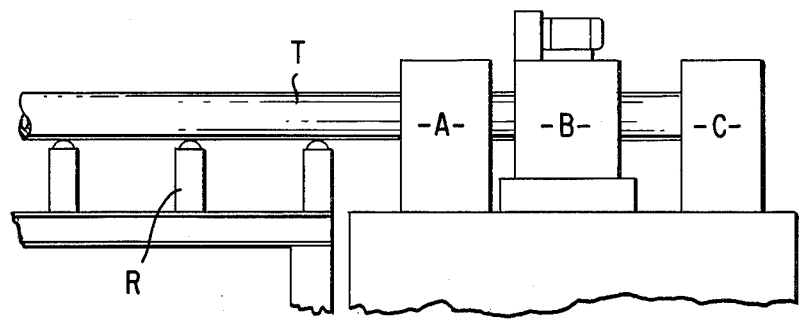
FIGURE 1 is a fragmentary diagrammatic side elevation showing the mechanism for conveying a length of tubing to a series of mechanisms constituting successively, the outside tube clamping mechanism, the tube cutting mechanism, and the inside tube chucking device and the stop mechanism triggering the operation of the several mechanisms.

Referring to FIGURE 1, R indicates a conveyor having a series of rollers which may be power driven for advancing a relatively long length of welded seam tubing T to and retracting same from the cutting mechanism. The tubing is first advanced sufficiently to engage the stop member in a housing C. Through suitable mechanism (not shown) the stop member actuates a switch, for example, for operating an outside tube clamping mechanism in the housing A for firmly clamping the outside of the tube. Intermediate the outside of the tube clamping mechanism A and the housing C is a cutter mechanism B having a pair of axially spaced revolving cutter mechanisms. These operate subsequent to the outside clamping of the tube by the mechanism in the housing A. Likewise carried by the housing C and suitably actuated thereby is an inside collet chuck over which the tubing T passes and which is actuated to effect interior clamping of that portion of the tubing disposed between the spaced revolving cutters.

Figure 2:
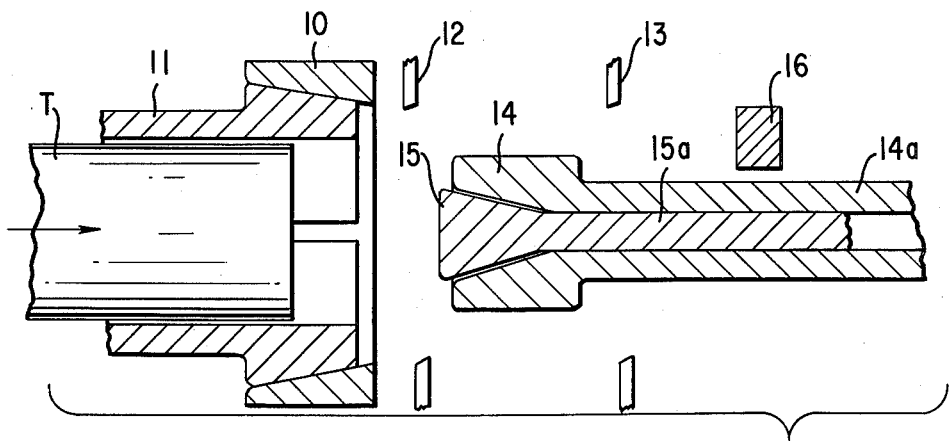
FIGURE 2 is a diagrammatic view in longitudinal section showing the position the parts assume as the tube is being advanced through the outside collet and with the revolving cutters, interior tube collet and stop mechanism in operative position.

Referring to FIGURE 2 the tubing T is shown entering a collet chuck which has an outside ring-shaped wedge member 10 and an inside elongate split sleeve 11 having a wedge shaped head to cooperate with the taper on the ring 10 for causing expansion of the sleeve upon longitudinal movement in one direction. In this figure the outside collet chuck is shown open enabling the tubing T to pass therethrough. It will be noted that closely in advance of the outside collet chuck are two sets of revolving cutter mechanisms 12 and 13 which are axially spaced from each other and are of the type to slide inward radially to engage the outside of the tubing, revolve around the clamped tubing T, thereby simultaneously to effect two longitudinally spaced cuts in the tubing.

Disposed in advance of the cutters 12 and 13 is a vertically shiftable stop member 16 which when engaged by the end of the tubing T triggers suitable instrumentalities (not shown) to actuate the outside collet chuck for clamping the outside of the tubing. Before engaging the stop member 16, the tubing T passes over an inside collet chuck which consists of a split sleeve having a clamping head 14 and an elongate sleeve extension 14a which projects to the right of the figure and inside is an actuating wedge cone 15 which has an elongate stem 15a extending through the sleeve extension 14a. The cone head 15 cooperates with the tapered surface on the inside of the clamping head for expanding the latter to the inside of the tubing T for a substantial portion of its length. Thus by movement of the cone head 15 in a longitudinal direction the clamping head 14 is expanded into firm engagement with the greater portion of the tubing between the cutters 12 and 13.

Figure 3:
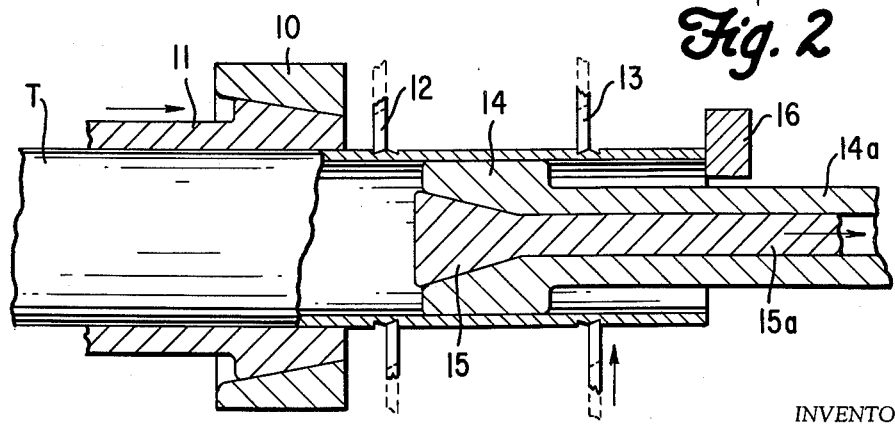
FIGURE 3 is a fragmentary diagrammatic view in longitudinal section showing the tubing having advanced into engagement with the stop or trigger switch mechanism, the outside tube collet being actuated to clamp and hold the tube, the cutters being advanced to position for severing sections from the tube, and the interior tube collet disposed in operative clamping position.

Referring to FIGURE 3, it will be observed that the tubing T has been advanced to engage the stop member 16 and as a consequence the outside collet chuck 10, 11 has firmly clamped the outside of the tubing T, the inside collet chuck 14, 15 has clamped the portion of the tubing between the revolving cutters 12 and 13, and the cutters have moved radially into cutting position. It will be manifest that the inside collet chuck firmly holds the portion of tubing which will become the test sample. That portion of the tubing between the cutters 13 and the trigger member 16 is the crop end which is discarded.

Figure 4:
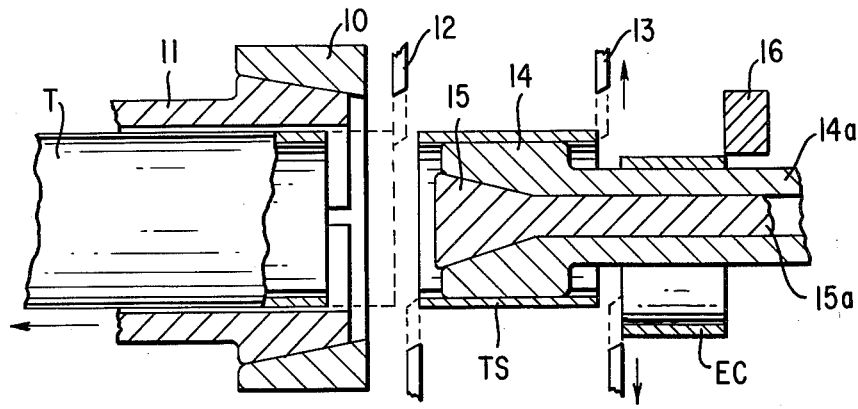
FIGURE 4 is a view somewhat similar to FIGURE 3 after severance of the end crop and test sample has been completed.

It will be noted in FIGURE 4 that the severed test sample TS is clamped by the inside collet chuck 14, 15 and the severed end crop EC is free but held from falling from the machine by the sleeve extension 14a. The cutters 12 and 13 have retracted radially from cutting positions. The outside collet chuck 10, 11 has now been released, the split sleeve 11 having moved longitudinally rearwardly to free the tubing T so that the tubing may be withdrawn in the direction of the arrow shown on FIGURE 4.

Figure 5:
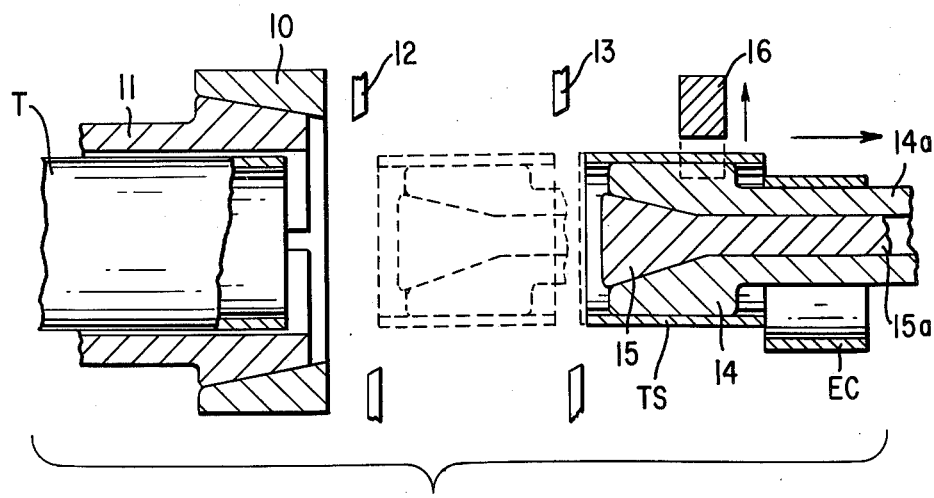
FIGURE 5 is a view similar to FIGURES 3 and 4 showing the interior tube collet having shifted to remove the severed tube sections, the cutter mechanisms and the stop-switch mechanism having moved laterally out of the way to enable discharge of the tube sections.

FIGURE 5 shows the next step in which the inside collet chuck is moving to the right of the figure as indicated by the arrow past the stop member 16 which has moved upwardly, the chuck carrying with it both the test sample TS and the end crop EC. The test sample TS is securely clamped by the inside collet chuck 14, 15 whereas the end crop EC is free but is restrained from falling from the mechanism. Manifestly after being moved a sufficient distance to clear the revolving cutters 12 and 13, the inside collet chuck is released by a forward movement of the collet stem 15a so that the test sample TS as well as the end crop EC may be ejected. Thereafter another length of tubing may be fed to the mechanihsm to crop the end and to produce the desired test sample.

Although the operating mechanism for effecting the operations and steps above described has not been illustrated, it is to be understood that such mechanism may be electrically energized in response to contact by the tubing T with the stop member 16 to set in motion the sequence of events described after which the mechanism is automatically deenergized.

In order to accommodate different diameters of tubing the collet chucks can be readily changed. It is preferable that the cutters 13 operate slightly in advance of the cutters 12 to enable the outside collet chuck 10, 11 to take the main cutting torque. The stop member 16 may be shifted from one position to another thereby to determine the amount of crop end to be cut.

Numerous changes in details of construction, arrangement and operation may be effected without departing from the spirit of the invention, especially as defined in the appended claim.

What I claim is:

Apparatus for cutting tube sections comprising a pair of longitudinally spaced revolving cutting elements, an inside collet chuck including an elongate split sleeve for engagement with the interior wall of the tubing for holding the tubing rigidly during the cutting of the tube sections, said split sleeve having a first portion engaging the interior wall of the tubing through a substantial portion of the space between said spaced cutting elements and a second portion of reduced transverse dimension, said first portion of said chuck adapted to positively retain at least one severed tube section after a cutting operation and said second portion of said chuck adapted to loosely hold at least one severed tube section after a cutting operation.

References Cited in the file of this patent

UNITED STATES PATENTS

| | | |
|---|---|---|
| 1,782,692 | Lawson | Nov. 25, 1930 |
| 2,262,178 | Gest et al. | Nov. 11, 1941 |
| 2,436,409 | Thornburgh | Feb. 24, 1948 |
| 2,521,003 | Gitter | Sept. 5, 1950 |
| 2,619,176 | Pearson | Nov. 25, 1952 |

FOREIGN PATENTS

| | | |
|---|---|---|
| 275,851 | Great Britain | Aug. 18, 1927 |